United States Patent

[11] 3,563,289

[72] Inventor James E. Altman
Box 334, Gray, Ga. 31032
[21] Appl. No. 770,147
[22] Filed Oct. 24, 1968
[45] Patented Feb. 16, 1971

[54] PEPPER CORING APPARATUS
20 Claims, 9 Drawing Figs.

[52] U.S. Cl. .................................................. 146/52
[51] Int. Cl. .................................................. A23n 3/12
[50] Field of Search .......................................... 146/52

[56] References Cited
UNITED STATES PATENTS

| | | | |
|---|---|---|---|
| 1,120,914 | 12/1914 | Dodson | 146/52 |
| 1,479,061 | 1/1924 | Fenn | 146/52 |
| 1,717,827 | 6/1929 | Ayars | 146/52 |
| 2,688,993 | 9/1954 | White | 146/52 |
| 3,434,517 | 3/1969 | Durand, Jr. et al. | 146/52 |

Primary Examiner—Willie G. Abercrombie
Attorney—Hill, Sherman, Meroni, Gross & Simpson ABSTRACT: An apparatus for coring peppers comprising a frame, an endless conveying means mounted on the frame, a plurality of pepper receiving cups carried by the endless conveying means from a receiving station, through the coring station and then to a discharge station, means mounted on the frame and disposed above the cups for cutting and for removing the cores from the remainder of the pepper, and means for rotating and simultaneously advancing the cutting and removing means into the peppers. The core cutting and removing means includes a mounting member suspended from the rotating and advancing means, a pair of cutting blades mounted for pivotal movement about a substantially horizontal axis between a cutting position and a core gripping position, each blade being formed with an arcuate configuration in transverse cross section circumscribing an angle substantially less than 180°, and the blades being disposed about a circumference of a common circle to provide a pair of vertically extending openings between adjacent, longitudinal edges of the blades.

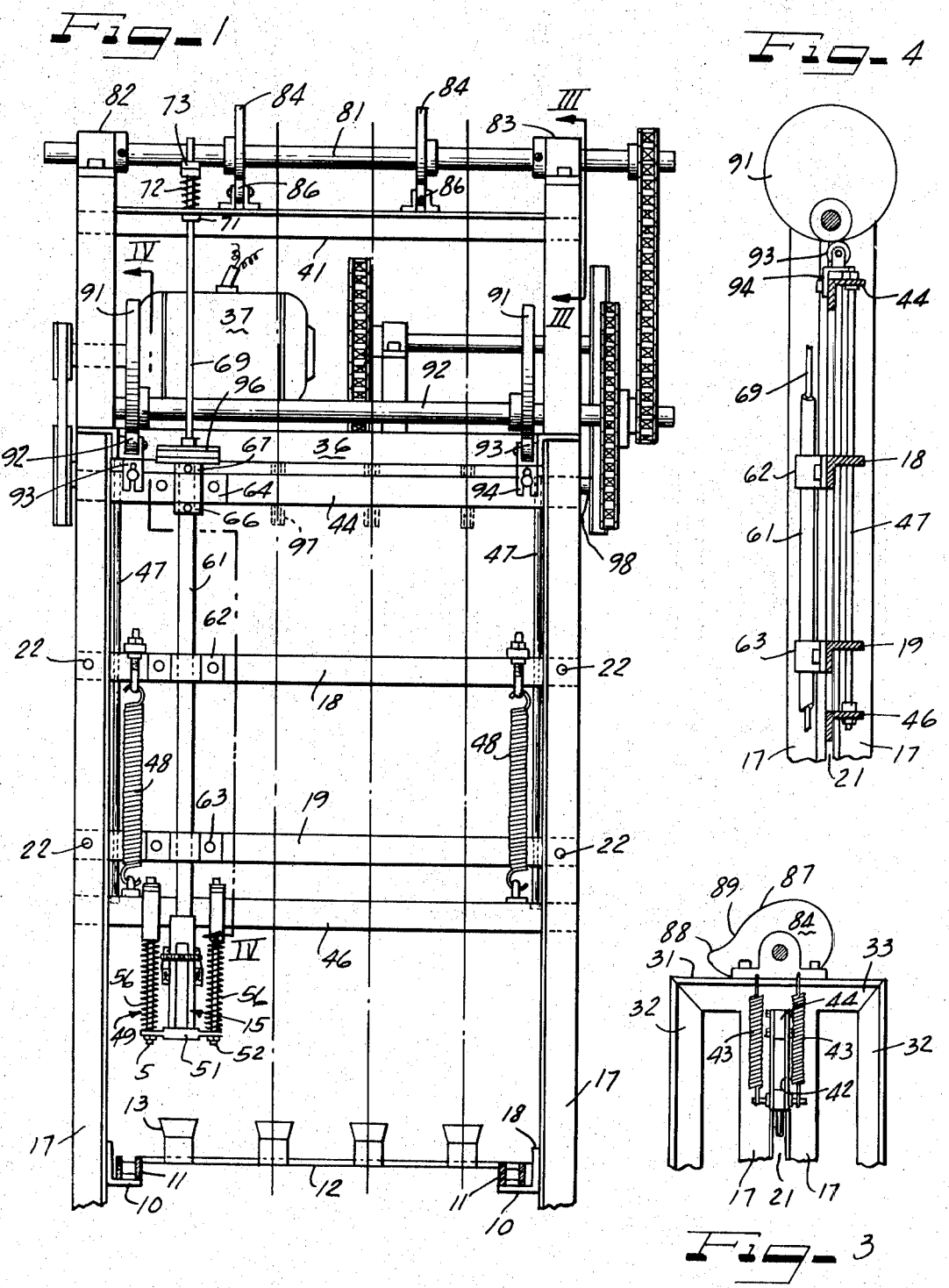

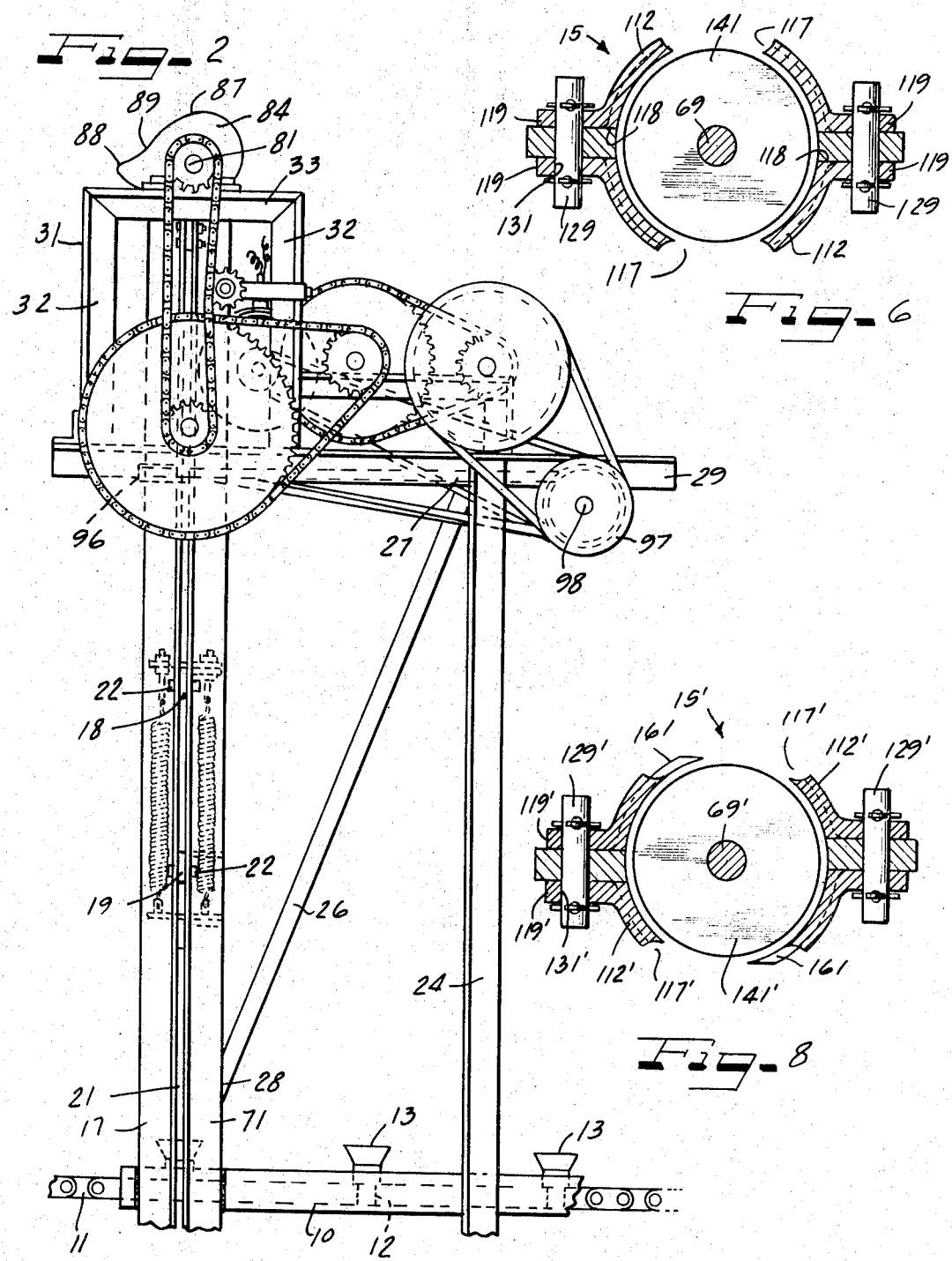

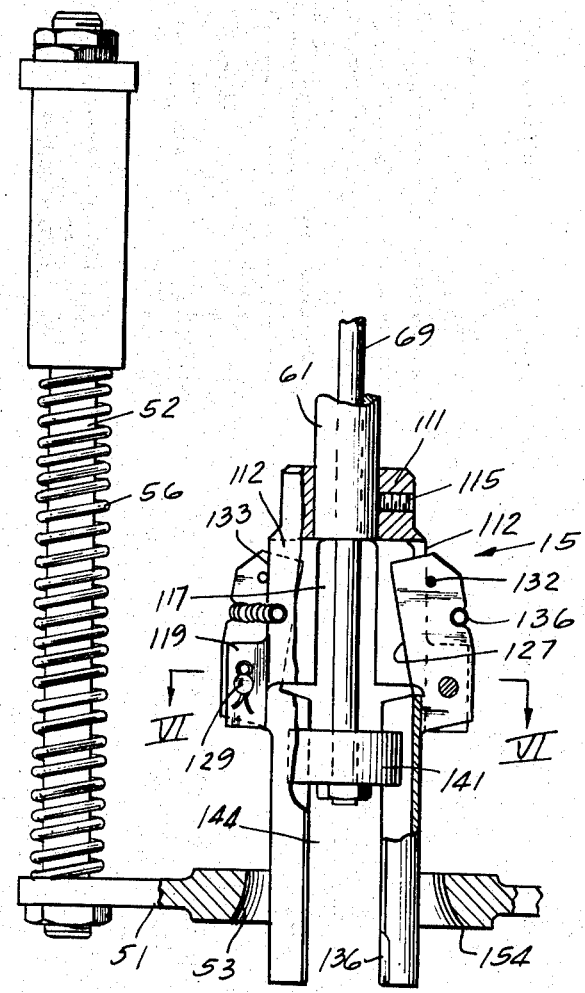
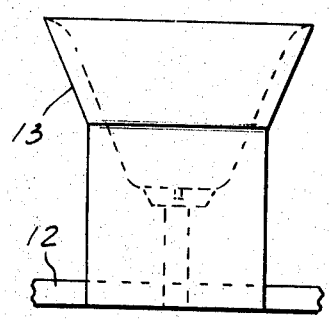
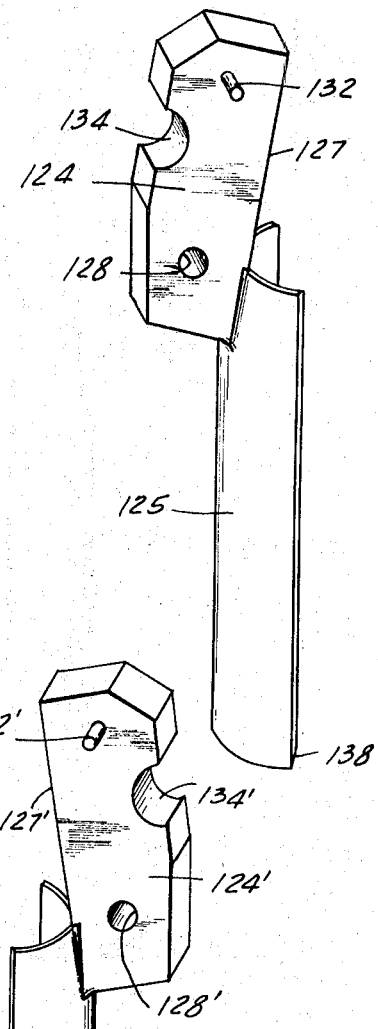
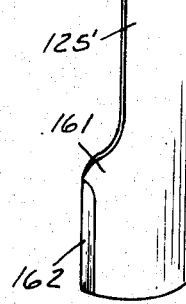
INVENTOR.
JAMES E. ALTMAN

PEPPER CORING APPARATUS

BACKGROUND OF THE INVENTION

1. Field of the Invention

This invention relates to an apparatus for coring peppers, and more particularly refers to a pepper coring apparatus having a discontinuous, substantially tubular cutting means for cutting the core of the pepper and for removing the cut core from the pepper.

2. Description of the Prior Art

Apparatus for coring fruit have been proposed heretofore, and an apparatus particularly adapted to coring pimiento peppers is disclosed in U.S. Pat. No. 2,683,477, which issued on Jul. 13, 1954. Also, an apparatus for coring pears is disclosed in U.S. Pat. No. 2,588,790 which issued Mar. 11, 1952. It is believed that the above-mentioned patents disclose machines representative of the prior art in the field of the present invention.

The pepper coring devices described in the prior art usually include a core cutting device comprising a tubular coring blade formed with a pair of diametrically opposed, longitudinally extending slots opening at a lowermost edge of the blade. In accordance with prior art teachings, a core gripping arm is pivotally disposed within each slot, thereby forming a core cutting and removing device which presents a continuous, tubular transverse cross section. In the prior art devices, the core gripping arms have been formed either to be coplanar with the lowermost edge of the cutting blade or to project below the lowermost edge thereof. In either case, the prior art teaches forming the cutting device with distinct core gripping arms separate from the tubular cutting blades cooperating therewith to form a continuous tubular structure.

It should be understood, that the cores of peppers for example, pimiento peppers, are coarse and abrasive and that the cutting devices proposed heretofore and constructed in the manner described hereinabove necessarily include substantially close fitting, moving parts. Therefore, the prior art devices have a distinct tendency to jam when small pieces of the core or stem become lodged between the closely fitting parts, thereby resulting in severe damage to the cutting blades and separate gripping arms.

SUMMARY OF THE INVENTION

In accordance with the present invention, a pepper coring apparatus is provided with a core cutting and removing device having a substantially open construction in the area which enters the pepper. In particular, the cutting device includes a pair of diametrically opposed, pivotally mounted, cutting blades with each blade formed of an arcuate segment circumscribing an angle substantially less than 180°. Accordingly, the cutting device has a discontinuous, tubular configuration providing a longitudinally extending opening between each pair of adjacent, longitudinal edges of the blades, thereby to form a cutting device having a substantially open construction.

Furthermore, the necessity for separate gripping arms has been eliminated by pivotally mounting the cutting blades and by providing means for moving the blades between a cutting position and a gripping position. In the cutting position, both blades lie on a circumference of a common circle, whereas in the gripping position each blade is pivoted towards the other to clamp the cut core therebetween.

In a second embodiment of the present invention, each cutting blade is formed substantially as described hereinabove, but further includes a cutting tip extending circumferentially from a lowermost portion of a longitudinally extending edge. The tip of one cutting blade is positioned diametrically opposite to the tip of the other cutting blade. When the blades are pivoted to the gripping position, the tip of one blade slightly overlaps the adjacent edge of the other blade. Furthermore, when one blade is pivoted inwardly toward the opposed blade, the distance from the longitudinal axis of the cylinder defined by the arcuate blade segments in the cutting position to the longitudinally extending edge of the cutting tip decreases, thereby forcing the cutting tip into cylindrically cut core. In this manner, the core is firmly gripped to assure that the same is completely removed from the pepper.

Therefore, the present invention overcomes the distinct disadvantage of the prior art devices by providing a cutting device having a discontinuous, tubular configuration and thus provides an open, nonjamming construction.

BRIEF DESCRIPTION OF THE DRAWINGS

In the accompanying drawings, forming a part of this specification and in which like reference characters are employed to designate like parts throughout the same:

FIG. 1 is a front elevational view of a pepper coring apparatus embodying the features of the present invention;

FIG. 2 is a fragmentary side elevational view of the apparatus illustrated in FIG. 1;

FIG. 3 is a fragmentary sectional view taken on line III-III of FIG. 1;

FIG. 4 is a fragmentary sectional view taken on line IV-IV of FIG. 1;

FIG. 5 is an enlarged elevational view, partly in section, illustrating a core cutting and removing device embodying the features of the present invention;

FIG. 6 is a sectional view taken on line VI-VI of FIG. 5;

FIG. 7 is a perspective view of one of the cutting blades of the cutting device illustrated in FIGS. 5 and 6;

FIG. 8 is a sectional view similar to that of FIG. 6, illustrating a second embodiment of the cutting device; and FIG. 9 is a perspective view similar to FIG. 7, illustrating the cutting blade of the second embodiment of the cutting device as illustrated in FIG. 8.

DESCRIPTION OF THE PREFERRED EMBODIMENTS

Referring to FIGS. 1 to 4, there is shown a pepper coring apparatus comprising a frame including a pair of spaced conveyor guide members 10. A chain conveyor has a pair of spaced chains 11 traveling over the guide members 10 and also has a series of supporting bars 12 extending between the chains. Pepper receiving cups 13 are equally spaced across each supporting bar 12. Uncored peppers are manually placed within the cups 13 and are carried thereby under a coring device generally shown at 15.

It will be noted, that a preferred embodiment of this invention, as illustrated in FIGS. 1 to 4, includes four pepper receiving cups 13 spaced across each supporting bar 12. It should be understood that any number of core receiving cups 13 may be positioned across each supporting bar 12 depending upon the desired application of the apparatus and also depending upon the space limitations of the machine.

In accordance with the principles of this invention, a cutting device such as 15 is positioned to be above each laterally spaced pepper receiving cup 13, but since all of the coring devices utilized in the apparatus are identical, only one of these devices has been illustrated in the drawings.

It is contemplated that the conveyor will move each laterally extending row of pepper receiving cups into register with the cutting devices 15. A drive mechanism for operating a chain conveyor in this manner is clearly described and illustrated in U.S. Pat. No. 2,588,790, in which the mechanism is used in carrying cups under the coring devices of a pear coring machine forming the subject matter of said patent.

The frame also includes a pair of vertically extending, spaced angle bars 17 arranged on opposite sides of the frame and attached to the conveyor guide members 10. Each pair of angle bars 17 are held in spaced relation with respect to each other by means of transversely extending bars 18 and 19 which are disposed in vertical spaced relation with respect to each other. Each transverse bar 18 or 19 has its opposed end portions disposed within guideways 21 formed by each pair of spaced angle bars 17. The transverse bars 18 and 19 are secured against movement by means of bolts 22.

As best illustrated in FIG. 2, the frame further includes an upright support member 24 disposed on either side of the framework rearwardly of the angle bars 17 and braced by diagonal members 26 having opposed end portions thereof respectively connected to the upper end portion of the support member as at 27 and to the angle bars 17 as at 28. A crossmember 29 horizontally extends from the uppermost end portion of each support member 24 to the associated pair of angle bars 17 and has opposed end portions thereof projecting beyond the support member and also beyond the angle bars. Rising from the bars 29, and secured thereto, are rectangular frame members 31 each of which includes vertical bars 32 connected at their upper ends by the horizontal bars 33. Furthermore, the frame of the apparatus includes a motor mount having spaced bars 36 providing support for the prime mover 37.

A horizontal, transverse bar 41 has its opposed end portions slidably disposed within the guideways 21 formed by the pairs of spaced angle bars 17. As best illustrated in FIG. 3, each end portion of the movable bar 41 has a downwardly extending extension thereon as at 42. A pair of coil springs 43 engage each extension 42 and also engage the vertically extending bar 33 of the frame 31 to urge the movable bar 41 upwardly.

A rectangular framework is also slidably disposed within the guideways 21 formed by the pairs of spaced angle bars 17 and includes a first transverse bar 44 and a second transverse bar 46 interconnected with the first transverse bar by means of a vertically extending rod 47. The movable frame work including the transverse bars rod and 46 is urged upwardly by coil springs 48. Each coil spring 48 has one end portion thereof secured to the stationary bar 18 and has the other end portion thereof secured to the movable bar 46 of the framework, thereby to normally urge the framework upwardly.

The lower transverse bar 46 of the movable framework includes a guide mechanism generally shown at 49 to provide a pilot through which the cutting device 15 passes and to provide means for holding a pepper while it is being cored. The guide mechanism 49 includes a guide plate 51 suspended from the transverse bar 46 by a pair of rods 52 having one end portion thereof secured to the transverse bar and having the other end portion thereof slidably passing through appropriately formed apertures in the guide plate. The guide plate 51 is urged downwardly by springs 56 which are piloted on the rods 52. As best seen in FIG. 5, the guide plate 51 also has a centrally located aperture 53 formed therein for loosely receiving the cutting device 15. The aperture 53 is upwardly tapered to provide a downwardly projecting large end as at 54 for engaging a pepper disposed within the associated cup 13, thereby to clamp the pepper while it is being cored.

The cutting device 15 is suspended from the lowermost end portion of a hollow tubular rod 61 which passes through bearing blocks 52 and 53 respectively secured to the stationary transverse bars 18 and 19. The hollow tubular rod 51 also passes through a bearing block 64 secured to the upper transverse bar 44 of the movable rectangular framework. The rod 61 has collars 66 and 67 secured thereto and disposed on opposed sides of the bearing block 64 to cause the tubular rod 61 to move with the movable framework.

A core knockout actuating rod 69 extends through the hollow tubular rod 61 and also passes through the upper transverse movable bar 41. The actuating rod 69 has a collar 71 secured thereto and positioned to engage an underneath surface of the movable bar 41 to cause the actuating rod to move downwardly with the bar. The actuating rod 69 also has a coil spring 72 piloted thereon and a second collar 73 secured thereto for clamping the spring between an upper surface of the movable bar 41 and the second collar. The spring 72 and the second collar 73 permit the actuating rod 69 to move upwardly with the transverse movable bar 41.

In accordance with the principles of the present invention, a cam mechanism is provided for vertically reciprocating the actuating rod 69. The cam mechanism includes a shaft 81 journaled within bearing blocks 82 and 83 secured to the horizontal support bars 33 of the supporting frames 31. The shaft 81 has a pair of identical cams 84, secured thereto, and each cam engages an associated roller 86 attached to the transverse movable bar 41. Each identical cam 84 is of a shape to provide an elongated configuration with a gradually curved edge 87 providing a substantially pointed end 88 for causing the bar 41 to gradually move downwardly until the pointed end of the cam passes over the rollers 86, whereupon the bar 41 will snap upwardly, for a predetermined distance, until the rounded end of the cam contacts the rollers 86. Each cam 84 is also characterized by a slight depression 89. Accordingly, the actuating rods 69 will gradually move downwardly with the movable transverse bar 41 and will be snapped upwardly when the pointed ends 88 of the cams 84 pass over the rollers 86.

The movable framework including the transverse bars 44 aNd 46 is also vertically reciprocated. To provide the vertical, reciprocal movement, a pair of eccentrics 91 are supported on a shaft 92 which has its end portions journaled in bearing blocks attached to the pairs of angle bars 17 disposed on opposed sides of the frame. The eccentrics 91 engage rollers 93 which are adjustably attached to the upper transverse bar 44 of the movable framework by means of adjustable supports 94. As the eccentrics 91 rotate, the movable framework, including transverse bars 44 and 46, is urged downwardly against the action of the springs 48 which in turn moves the hollow tubular rods 61 and the cutting devices 15 downwardly so that the cutting devices engage peppers disposed within the cups 13. As the eccentrics 91 continue to rotate, the cutting devices 15 and supporting rods 61 move upwardly to allow a subsequent row of pepper receiving cups 13 to move into position beneath the cutting devices.

Also, in accordance with the principles of the present invention, the tubular supporting rods 61 and the cutting devices 15 are rotated about a horizontal axis. The rotary motion is transmitted to the tubular supporting rods 61 by means of the sheaves 96 which are secured to the upper end portion of each tubular rod. Each sheave 96 has a belt 95 trained therearound, and the belts 95 engage horizontally disposed sheaves as at 97. The sheaves 97 are supported on a horizontally extending shaft 98.

The shaft 81 having cams 84 secured thereto, the shaft 92 having eccentrics 91 secured thereto and the shaft 98 having the sheaves 97 attached thereto are appropriately rotated by means of a drive mechanism including various belts, sheaves, chains and sprockets which derive their power from the prime mover 37. A detailed description of the drive mechanism is contained within the description of the pepper coring device disclosed in U.S. Pat. No. 2,683,477, which issued on Jul. 13, 1954.

Referring now to FIGS. 5 to 7, there is shown, in detail, a cutting device 15 embodying the features of the present invention.

In accordance with this invention, the cutting device 15 includes a mounting member comprising a base 111 and a pair of diametrically opposed, arcuate flanges 112 depending therefrom. The base 111 has a centrally located aperture formed therethrough for receiving the lowermost end portion of the hollow tubular rod 61. The base 111 is secured to the rod 61 by means of at least one transversely extending setscrew as at 115.

The arcuate, depending flanges 112 are welded or otherwise secured to the cylindrical base member 111. Each arcuate flange 112 circumscribes an angle substantially less than 180°, thereby to provide a wide opening between adjacent, longitudinal edges of the flanges as at 117. Each flange 112 also has a vertically extending slot 118 therein characterized by a pair of radially outwardly extending flanges bracketing the slot.

In accordance with the principles of the present invention, a pair of cutting blades 125 are pivotally connected on diametrically opposed sides of the mounting member including the base 111 and the depending flanges 112. Each cutting blade has an attachment member 124 welded or otherwise secured to the upper end portion thereof. It is contemplated by the present invention that the attachment member 124 be secured to a cutting blade 125 at a slight angle relative to the longitudinally extending axis of the blade to provide an inwardly projecting cam surface when the cutting blades are disposed within the opposed slots formed in the depending flanges 112. The attachment member 124 also has an aperture 128 formed therethrough for receiving the cotter-pinned rod 129 which in turn passes through apertures 131 in the flanges 119, thereby to pivotally secure the cutting blades to the depending flanges 112.

A stop pin 132 passes through the attachment member 124 and extends outwardly from either side thereof to engage an outer cylindrical surface formed on the depending flanges 112 as at 133. A recess 134 is formed on the outwardly projecting surface of the attachment 124 and is disposed between the aperture 128 and the stop pin 132. A coil spring 136 is wrapped around the flanges 112 and passes over the recesses 134, thereby urging the cutting blades into their vertically extending position and also urging the stop pin 132 into engagement with the outer surface 133 of the depending flanges 112.

In accordance with the principles of this invention, each cutting blade 125, which is secured to its associates attachment member 124, has an arcuate transverse cross section subscribing an angle substantially less than 180°. Also, each cutting blade 125 has a lowermost portion of one longitudinally extending edges thereof inwardly beveled as at 136 to provide a sharp cutting edge for severing a core from a pepper. It is contemplated by the present invention that the inwardly beveled cutting edge 136 of one of the cutting blades 125 be diametrically opposed to the beveled cutting edge of the other cutting blade, and that the longitudinally extending cutting edges be positioned to cut into the core as the cutting device 15 is rotated by the tubular rod 61. Also, the downwardly extending arcuate edge of each cutting blade 125 has its interior surface beveled outwardly to provide a sharp downwardly projecting edge on the cutting blade.

In accordance with the present invention, the arcuately shaped cutting blades are movable between a cutting position, wherein the blades are substantially vertically extending, and a core gripping position, wherein the blades are pivoted toward one another. To accomplish the pivoting motion, a cylindrical plug 141 is secured to the lowermost end portion of the actuating rod 69 which passes centrally through the hollow tubular rod 61. The plug 141 is centrally disposed within a cylinder defined by the arcuate cutting blades in their cutting position and is reciprocated by the actuating rod 69. When the cylindrical knockout plug 141 moves upwardly, such upward movement occurring as the pointed ends 88 of the cams 84 pass over the rollers 86 associated with the movable transverse bar 41, the knockout plug engages the cam surfaces 127 formed by the attachment members 124, thereby pivoting the cutting blades 125 inwardly toward one another to grip the previously severed core. The knockout plug 141 is held in its uppermost position as the cutting device 15 is slowly moved upwardly by the action of the eccentrics 91 and the rollers 93, thereby to extract the severed core from the pepper. As the cutting device 15 approaches its uppermost position, the knockout plug 141 is urged downwardly to push the severed core from between the cutting blades 125 which are again pivoted to their cutting position by the action of the coil spring 136. Thus, the present invention provides a positive means for removing the extracted core from between the cutting blades 125.

It is also contemplated by the present invention, that the cutting blades 125, which have an arcuate shape circumscribing an angle substantially less than 180°, be positioned around a circumference of a common circle and circumferentially spaced from one another to provide a wide, vertically extending opening 144 between each pair of adjacent, longitudinal edges of the blades. It is desirable to have the openings 144 formed by the cutting blades 125 in alignment with the longitudinally extending openings 117 formed by the depending flanges 112.

In accordance with the principles of this invention, the open construction of the cutting device 15, provided by the wide openings 144, allows portions of the core not pushed out by the knockout plug 141 to be thrown outwardly from the cutting blades 125 by the centrifugal action imparted by the continuous rotation of the cutting device. Therefore, the cutting device 15 provides both a positive clean means due to the reciprocatory action of the knockout plug 141 and an inherent self-cleaning feature due to the open construction of the blades and the centrifugal force caused by the rotation of the cutting device.

Referring now to FIGS. 8 and 9, there is shown a second embodiment of a cutting blade generally designated by the reference character 125'. The cutting blade 125' is secured to an attachment member 124' having an aperture 128', a recess 134', a stop pin 132' and a cam surface 127' similar in all respects to the corresponding features of the attachment member 124 constructed in accordance with the first embodiment of this invention. In a like fashion, a base 111' and depending flanges 112' are included in a cutting device 15' constructed in accordance with the second embodiment and correspond in configuration to similar parts of the cutting device 15.

The cutting blades 125' distinguish from the cutting blades 125 of the first embodiment by further including a circumferentially extending cutting tip 161. Each cutting blade 125' includes a cutting tip such as 161 circumferentially extending from a lower portion of one of the horizontally extending edges of the blade. Thus, each blade 125' has a body portion having an arcuate, transverse cross section formed identical to the cutting blade 125 and also has a cutting tip 161 extending circumferentially from the body portion.

In accordance with the principles of the present invention, the cutting tip 161 has its outwardly projecting, longitudinal surface inwardly beveled as at 162 to provide a sharp cutting edge for severing a core from a pepper. The cutting tip 161 of one cutting blade 125' extends circumferentially from the body portion in a direction to be diametrically opposed to the cutting tip of the other cutting blade. It is contemplated by the present invention that the cutting tip 161 will extend from the body portion of the cutting blades 125' for only a short distance, thereby still providing a substantially wide opening between the outermost longitudinal edge of each cutting tip and the adjacent longitudinal edge of the opposed cutting blade.

Due to the increased angle circumscribed by the combined body portion and cutting tip 161 of each cutting blade 125', the cutting tip slightly overlaps the adjacent, longitudinal edge of the opposed cutting blade when the blades are pivoted inwardly to their gripping position by the action of the knockout block 141'.

It should also be apparent, that when the blades are pivoted inwardly toward their gripping position, the distance from the longitudinal axis of a cylinder defined by the arcuate cutting blades in their cutting position to the longitudinally extending cutting edge of the tip decreases, thereby causing the cutting tip to be forced into the cylindrically cut core. In this manner, the core is firmly gripped to assure that the same is completely torn loose from the meaty portion of the cored pepper.

In operation of the pepper coring apparatus embodying the features of present invention, the machine is set in motion, and uncored peppers are manually positioned in the pepper receiving cups 13. The chains 11 advance the cups 13 into register with the cutting devices 15 or 15', which are being rapidly rotated. Due to the configuration of the eccentrics 91 relative to the rollers 92, the cutting devices 15 or 15' are gradually moved into contact with the peppers to be cored. As the cutting devices 15 or 15' approach the cups 13, the guide plates 51 gently engage the peppers to hold the same during the coring operation. Further downward movement of the cutting devices 15 causes the cutting blades 125 or 125' to engage the peppers and to cut a cylindrical slot between the pepper core and the meaty portion of the pepper.

While the eccentrics 91 are moving the cutting devices 15 or 15' into engagement with the peppers, the cams 84 are also rotating to gradually move the knockout plugs 141 or 141' downwardly. As the cutting devices 15 or 15' approach their lowermost position, the pointed ends 88 of the cams 84 passes over the rollers 86 causing the knockout plugs 141 or 141' to snap upwardly and engage the inclined cam surfaces 127 or 127', thereby pivoting the cutting blades 125 or 125' into the gripping position.

As the cutting devices 15 15' are slowly extracted from the cored peppers, the cams 84 rotate to cause the rollers 86 to engage the slight depression 89, thus moving the knockout plug upwardly with the cutting devices to retain the cutting blades 125 or 125' in their gripping position. During further upward movement of the cutting devices 15 or 15', the cams 84 continue to rotate to bring the smooth surfaces 87 thereof into engagement with the rollers 86 for urging the knockout plugs 141 or 141' downwardly, thereby permitting the cutting blades 125 or 125' to return to their cutting position and forcing the severed cores from between the cutting blades. It should also be noted, that the open construction of the cutting devices 15 and 15' in cooperation with the continuous rotation of the cutting devices permits any portions of the peppers not removed by the knockout plugs 141 or 141' to be centrifugally thrown from the cutting devices.

As the cutting devices 15 or 15' are moving upwardly, the chain conveyors 11 are advancing to bring another row of cups 13 into register with the cutting devices to initiate another cycle of the apparatus.

Although minor modifications might be suggested by those versed in the art, it should be understood that I wish to embody within the scope of the patent warranted hereon all such modifications as reasonably and properly come within the scope of my contribution to the art.

I claim:

1. In an apparatus for coring peppers having a frame, and endless conveyor mounted on the frame, a plurality of pepper receiving cups carried by the conveyor, cutting means mounted on the frame and disposed above the cups, and means for rotating and simultaneously advancing the cutting means into the peppers, the improvement comprising:

the cutting means including:
        a mounting member suspended from the rotating and advancing means;
        a pair of cutting blades mounted on said mounting member for pivotal movement about a substantially horizontal axis between a cutting position and a core gripping position, each said cutting blade having an arcuate configuration in transverse cross section, said blades normally disposed about a circumference of a common circle and formed with a circumferentially extending length to provide a vertically extending opening between each pair of adjacent, longitudinal edges of said blades, said opening being of a sufficient width to permit the centrifugal action imparted to the blades by the rotating means to automatically clean said cutting blades;
        means suspended from said mounting member for moving said blades between a cutting position and a core gripping position; and
        means including a member mounted for reciprocal movement within said cutting blades and axially moving outwardly of said blades for removing a cut core therefrom.

2. An apparatus for coring peppers as defined in claim 1, further characterized by said mounting member having a discontinuous tubular configuration providing a pair of diametrically opposed, longitudinally extending openings in alignment with the openings formed between said blades.

3. An apparatus for coring peppers as defined in claim 1, further characterized by:
    said mounting member having a substantially tubular configuration in transverse cross section and being formed with a pair of diametrically opposed, longitudinally extending slots; and
    said cutting blades including an attachment member fittingly received within said slots of said mounting member.

4. An apparatus for coring peppers as defined in claim 1, wherein said means for moving said blades between a cutting position and a core gripping position comprises:
    a cylindrical actuator mounted for vertical, reciprocal movement; and
    an inclined cam surface formed on each said cutting blade engageable with said actuator to cause said blades to pivot inwardly toward one another in response to upward movement of said actuator relative to said blades.

5. An apparatus for coring peppers as defined in claim 1, wherein the cutting means further includes means biasing said blades toward the cutting position thereof.

6. In an apparatus for coring peppers having a frame, an endless conveyor mounted on the frame, a plurality of pepper receiving cups carried by the conveyor, cutting means mounted on a frame and disposed above the cups, and means for rotating and simultaneously advancing the cutting means into the peppers, the improvement comprising:

the cutting means including:
        a mounting member suspended from the rotating and advancing means;
        a pair of cutting blades mounted on said mounting member for pivotal movement about a substantially horizontal axis between a cutting position and a core gripping position, each cutting blade having a body portion formed with an arcuate, transverse cross section and also having an arcuate cutting tip circumferentially extending from a lowermost end portion of said body portion with the cutting tip of one blade formed diametrically opposite to the cutting tip of the other blade;
        when said blades are disposed in the cutting position said arcuate body portions lie on a circumference of a common circle and have a circumferentially extending length to provide a vertically extending opening between adjacent longitudinal edges of said blades;
        said openings having a sufficient width to permit rotational movement of said blades to automatically clean the same;
        said cutting tips having a circumferentially extending length relative to said body portion to permit said tip of one of said blades to overlap said body portion of said other blade when said blades pivot to the core gripping position; and
        means suspended from said mounting member for moving said blades between the cutting position and the core gripping position.

7. An apparatus for coring peppers as defined in claim 6, further characterized by said mounting member having a discontinuous tubular configuration providing a pair of diametrically opposed, longitudinally extending openings in alignment with the openings formed between said blades.

8. An apparatus for coring peppers as defined in claim 6, further characterized by:
    said mounting member having a substantially tubular configuration in transverse cross section and being formed with a pair of diametrically opposed, longitudinally extending slots; and
    said cutting blades including an attachment member fittingly received within said slots of said mounting member.

9. An apparatus for coring peppers as defined in claim 6, wherein said means for moving said blades between a cutting position and a core gripping position comprises:
    a cylindrical actuator mounted for vertical reciprocal movement; and
    an inclined cam surface formed on each said cutting blade engageable with said actuator to cause said blades to pivot inwardly toward one another in response to upward movement of said actuator relative to said blades.

10. An apparatus for coring peppers as defined in claim 6, wherein the cutting means further includes means biasing said blades toward the cutting position thereof.

11. A cutting device, for use with an apparatus for coring peppers having a frame, an endless conveyor mounted on the frame, a plurality of pepper receiving cups carried by the conveyor, and means for rotating and simultaneously advancing the cutting device into the peppers, comprising:
   a mounting member suspended from the rotating and advancing means;
   a pair of cutting blades mounted on said mounting member for pivotal movement about a substantially horizontal axis between a cutting position and a core gripping position, each said cutting blade having an arcuate configuration in transverse cross section, said blades normally disposed about the circumference of a common circle and formed with a circumferentially extending length to provide a vertically extending opening between adjacent, longitudinal edges of said blades, said openings being of a sufficient width to permit the rotational movement of said cutting blades to automatically clean the same;
   means suspended from said mounting member for moving said blades between the cutting position and the core gripping position; and
   means including a member mounted for reciprocal movement within said cutting blades and axially moving outwardly of said blades for removing a cut core therefrom.

12. A cutting device as defined in claim 11, further characterized by said mounting member having a discontinuous tubular configuration providing a pair of diametrically opposed, longitudinally extending openings in alignment with the openings formed between said blades.

13. A cutting device as defined in claim 11, further characterized by:
   said mounting member having a substantially tubular configuration in transverse cross section and being formed with a pair of diametrically opposed, longitudinally extending slots; and
   said cutting blades including an attachment member fittingly received within said slots of said mounting member.

14. A cutting device as defined in claim 11, wherein said means for moving said blades between a cutting position and a core gripping position comprises:
   a cylindrical actuator mounted for vertical, reciprocal movement; and
   an inclined cam surface formed on each said cutting blade engageable with said actuator to cause said blades to pivot inwardly toward one another in response to upward movement of said actuator relative to said blades.

15. A cutting device as defined in claim 11, further comprising means biasing said blades toward the cutting position thereof.

16. A cutting device, for use with an apparatus for coring peppers having a frame, an endless conveyor mounted on the frame, a plurality of pepper receiving cups carried by the conveyor, and means for rotating and simultaneously advancing the cutting means into the peppers, comprising:
   a mounting member suspended from the rotating and advancing means;
   a pair of cutting blades mounted on said mounting member for pivotal movement about a substantially horizontal axis between a cutting position and a core gripping position, each said cutting blade having a body portion formed with an arcuate transverse cross section and also having an arcuate cutting tip circumferentially extending from the lowermost end portion of said body portion with the cutting tip of one blade formed diametrically opposite to the cutting tip of the other blade, when said blades are disposed in the cutting position said arcuate body portions lie on a circumference of a common circle and have a circumferentially extending length to provide a vertically extending opening between adjacent, longitudinal edges of said blades, said openings having a sufficient width to permit rotational movement of said blades to automatically clean the same;
   said cutting tips having a circumferentially extending length relative to said body portions to permit said tip of one of said blades to overlap said body portion of said other blade when said blades pivot to the core gripping position; and
   means suspended from said mounting member for moving said blades between the cutting position and the core gripping position.

17. A cutting device as defined in claim 16, further characterized by said mounting member having a discontinuous tubular configuration providing a pair of diametrically opposed, longitudinally extending openings in alignment with said openings formed between said blades.

18. A cutting device as defined in claim 16, further characterized by:
   said mounting member having a substantially tubular configuration in transverse cross section and being formed with a pair of diametrically opposed, longitudinally extending slots; and
   said cutting blades including an attachment member fittingly received within said slots of said mounting member.

19. A cutting device as defined in claim 16, wherein said means for moving said blades between a cutting position and a core gripping position comprises:
   a cylindrical actuator mounted for vertical, reciprocal movement; and
   an inclined cam surface formed on each said cutting blade engageable with said actuator to cause said blades to pivot inwardly toward one another in response to upward movement of said actuator relative to said blades.

20. A cutting device as defined in claim 16, further comprising means biasing said blades toward the cutting position thereof.